United States Patent
Young et al.

[11] Patent Number: 5,839,830
[45] Date of Patent: Nov. 24, 1998

[54] PASSIVATED DIAMOND FILM TEMPERATURE SENSING PROBE AND MEASURING SYSTEM EMPLOYING SAME

[75] Inventors: Jack P. Young, Oak Ridge; Gleb Mamantov, Knoxville, both of Tenn.

[73] Assignee: Martin Marietta Energy Systems, Inc., Oak Ridge, Tenn.

[21] Appl. No.: 822,147

[22] Filed: Mar. 21, 1997

Related U.S. Application Data

[63] Continuation of Ser. No. 308,855, Sep. 19, 1994, abandoned.
[51] Int. Cl.$^6$ ............... G01K 11/00; G01K 13/00; G01K 1/10; G01K 1/12
[52] U.S. Cl. ............... 374/161; 374/140; 374/120; 356/301; 385/12
[58] Field of Search ............... 374/120, 161, 374/140; 356/301; 385/12

[56] References Cited

U.S. PATENT DOCUMENTS

| | | | |
|---|---|---|---|
| 2,071,531 | 2/1937 | Hulme . | |
| 2,102,955 | 10/1937 | Hulme . | |
| 4,573,761 | 3/1986 | McLachlan et al. | 356/301 |
| 4,796,671 | 1/1989 | Furushima et al. | 374/139 |
| 4,823,166 | 4/1989 | Hartog et al. | 374/161 |
| 5,028,146 | 7/1991 | Wada | 374/161 |
| 5,064,295 | 11/1991 | Thill et al. | 374/140 |
| 5,164,999 | 11/1992 | Shifflett | 385/12 |
| 5,180,228 | 1/1993 | Tarumi et al. | 374/140 |
| 5,201,022 | 4/1993 | Shifflett | 385/128 |
| 5,217,306 | 6/1993 | Wada | 356/301 |
| 5,272,334 | 12/1993 | Sai | 374/161 |
| 5,290,103 | 3/1994 | Fevrier et al. | 374/161 |
| 5,292,196 | 3/1994 | Iida et al. | 374/161 |
| 5,308,162 | 5/1994 | Amano et al. | 385/12 |
| 5,332,449 | 7/1994 | Verstreken et al. | 136/234 |
| 5,381,229 | 1/1995 | Murphay et al. | 374/161 |
| 5,447,373 | 9/1995 | Okuhara | 356/44 |

OTHER PUBLICATIONS

Sheng Dai et al, "Temperature Measurement by Observation of the Raman Spectrum of Diamond," *Appl. Spectros.*, 46 (1992), p. 375.

*Primary Examiner*—Diego F. F. Gutierrez
*Attorney, Agent, or Firm*—Edward A. Pennington; Shelley L. Stafford; Christopher J. Hamaty

[57] ABSTRACT

A high temperature sensing probe includes an optical fiber or rod having a distal end and a proximal end. The optical fiber or rod has a coating secured to the distal end thereof, wherein the coating is capable of producing a Raman spectrum when exposed to an exciting radiation source.

17 Claims, 1 Drawing Sheet

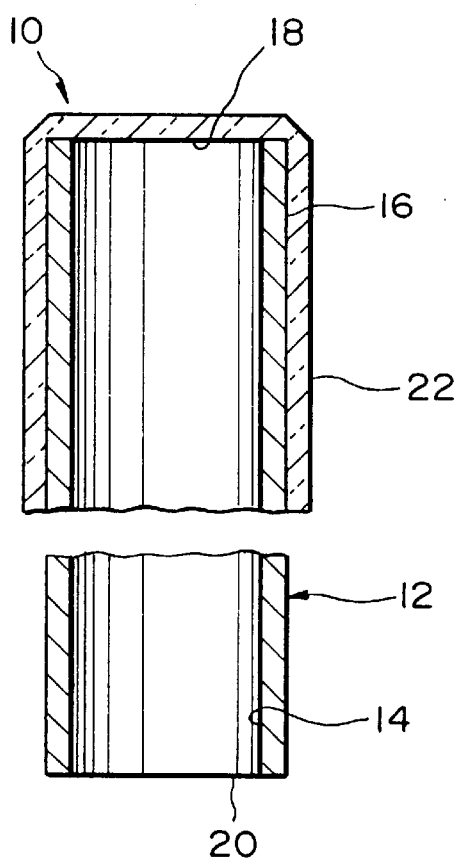
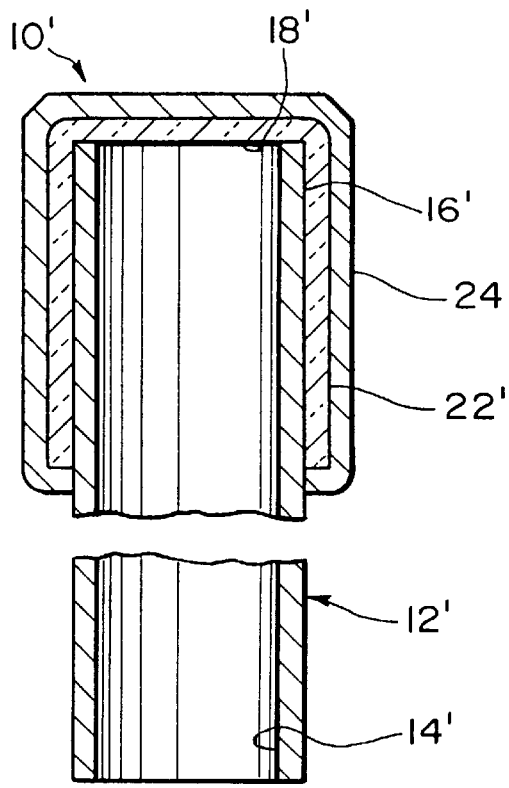
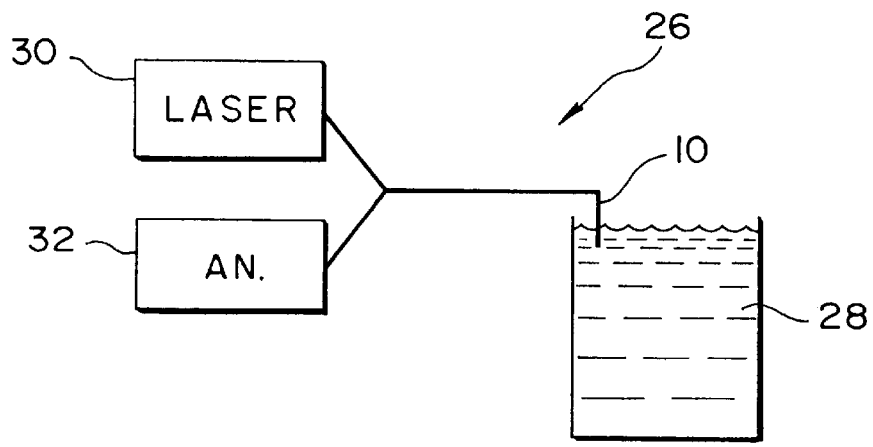

PASSIVATED DIAMOND FILM TEMPERATURE SENSING PROBE AND MEASURING SYSTEM EMPLOYING SAME

This is a continuation of application Ser. No. 08/308,855, filed on Sep. 19, 1994, now abandoned.

This invention was made with Government support under contract DE-AC05-840R21400 awarded by the U.S. Department of Energy to Martin Marietta Energy Systems, Inc. and the Government has certain rights in this invention.

FIELD OF THE INVENTION

The present invention relates generally to high temperature sensors, and more particularly, to high temperature sensors incorporating materials which exhibit a Raman signal. An optical fiber is diamond coated at one end portion thereof. When the coated end portion is placed in a high temperature melt, light transmitted into the optical fiber undergoes a characteristic change which correlates to changes in the temperature of the melt.

BACKGROUND OF THE INVENTION

Current temperature sensors make it difficult, if not impossible, to measure the temperature of high temperature metallic melts. For example, it is currently not possible to continuously measure the temperature of cryolite (NaF—$AlF_3$) melts in the aluminum production industry. Specifically, the only measuring technique currently available for use with cryolite melts involves the use of thermocouples, which are quickly destroyed by the melt. The inability to effectively monitor the temperature of the melt makes it difficult to control the temperature of the melt and improve the efficiency of aluminum production.

Fiber optic thermometers are known for measuring high temperature furnaces. In U.S. Pat. No. 5,201,022 to Shifflett, an optical fiber thermometer system generally includes a black body radiator secured to an optical fiber. The optical fiber has a "hot" end positioned in the furnace being tested and a "cold" end coupled to receiving and decoding electronics. The optical fiber includes a sapphire or silica core with a pure platinum coating.

The Raman spectrum of diamond has been shown to be useful in facilitating temperature measurements. Sheng Dai, J. P. Young, C. M. Begun, Gleb Manantov, "Temperature Measurement by Observation of the Raman Spectrum, of Diamond," *App. Spectros.*, 46, p. 375 (1992). In this publication, an experimental fiber optic probe included a diamond window placed in a quartz tube. Raman shifts in a transmitted laser light wave were correlated to variations in temperature. The Dai et al. publication is incorporated herein by reference.

A fiber optic probe for measuring sensitive Raman analysis is described in U.S. Pat. No. 4,573,761 to McLachlan et al. The probe includes a series of optical fibers, one for transmitting exciting light into a sample and the others for returning a Raman signal to diagnostic equipment attached at the other end of the probe.

It should be noted that although radiation with wavelengths in the visible and ultraviolet ranges is preferred for creating a Raman signal because of their high energy levels, the application of radiation having any wavelength will produce the Raman effect.

Despite the advances disclosed in the prior art, a need exists for a high temperature sensing probe capable of withstanding the corrosive environs of high temperature metallic melts, such as cryolite melts in the aluminum industry. The present invention provides such a sensor.

SUMMARY OF THE INVENTION

An object of the present invention is to provide a high temperature sensing probe and temperature measuring system incorporating same, in which the probe is capable of withstanding the corrosiveness of a high temperature metallic melt.

A further object of the present invention is to provide a high temperature sensing probe which can be used in a corrosive environment for prolonged periods of time, for continuous monitoring of high temperature melts, such as cryolite.

Another object of the present invention is to provide a sensor employing the Raman spectrum produced by a protective material to accurately and reliably obtain temperature information.

These and other objects of the present invention are achieved by providing a high temperature sensor comprising a fiber optic rod having a distal end and a proximal end. The fiber optic rod having a coating secured to the distal end of the rod, wherein the coating is capable of producing a Raman spectrum when exposed to exciting radiation.

Other objects, advantages and salient features of the invention will become apparent from the following detailed description, which taken in conjunction with the annexed drawings, discloses the preferred embodiment of the present invention.

BRIEF DESCRIPTION OF THE DRAWINGS

FIG. 1 is a cross sectional view of a first, preferred embodiment of a temperature probe according to the present invention;

FIG. 2 is a cross sectional view of an alternate embodiment of the temperature probe of the present invention; and FIG. 3 is a schematic view of a temperature measuring system of the present invention.

DETAILED DESCRIPTION OF THE PREFERRED EMBODIMENT

Referring to FIG. 1, a probe 10 is especially suited for high temperature, corrosive environments, such as, metallic melts. The probe 10 can be used to continuously monitor the temperature of cryolite (NaF—$AlF_3$) melts in the aluminum production industry, although a wide variety of other applications are anticipated.

The probe 10 includes means for transmitting electromagnetic radiation into a heated sample, such as a metallic melt. Any suitable transmitting device may be employed. In the illustrated embodiment, the transmitting means is an optical fiber 12 having a core 14 and a cladding 16.

The core 14 can be made of any suitable optically transmissive material, such as, silica, zirconia and sapphire. The core may also be in the form of a rod, which is generally thicker in diameter and therefore more rigid than an optical fiber. The cladding 16 can be any suitable cladding material which gives the optical fiber 12 its characteristic internal reflection.

The optical fiber 12 has a first or distal end 18 and a second or proximal end 20. The first end 18 is adapted to be inserted into or otherwise juxtaposed to a heated sample. When sensing the temperature of a metal melt, for example, the end 18 would be placed into the metal melt.

A protective covering 22 is applied over the end 18 and adjacent end portion of the optical fiber 12 to protect same from the corrosive melt. The covering 18 is made of a material which preferably has a corrosion resistance quality and also an optical quality. The optical quality is required for temperature analysis.

Preferably, the covering 22 is a diamond coating formed on the end and end portion of the optical fiber 12 by any suitable means. One example of forming the coating is chemical vapor deposition (CVD). While diamond is preferred, other carbon-based materials may be employed, such as glassy carbon, and graphite. Synthetic diamond materials may also be employed.

Where the probe 10 is to be used in melts which are more corrosive to carbon-based coatings, a second covering can be provided. Referring to FIG. 2, the same, but primed, reference numerals are used to describe a probe 10' used, for example, in steel melts.

The second, outermost covering 24 can be formed as a coating on the diamond coating 22'. The outer coating may be made from zirconium dioxide, titanium nitride, and titanium diboride. This outer covering need not be transparent and can be any material capable of protecting the underlying diamond coating.

A temperature measuring system 26 employing the probe 10 is illustrated in FIG. 3. The distal end of the probe 10 is placed in a metallic melt 28. A length of the probe 10 is coated with diamond to prevent the melt 28 from corroding that portion of the optical fiber which is disposed in the melt.

Again referring to FIG. 3, exciting radiation of a suitable wavelength is transmitted into the proximal end of the optical fiber from a source 30. The source can be a laser, such as a 514.5 nm line of an argon-ion laser.

An analyzer 32 receives light scattered from the diamond-coated end 18 of the probe 10. This scattered light has a characteristic which changes in accordance with changes in temperature.

Any suitable analyzer could be employed, such as a HG.2s Raman spectrometer by Instruments SA. This instrument uses a double monochromator equipped with curved holographic gratings. A S-20 type cooled photomultiplier tube can be used with pulse counting electronics and a Nicolet 1170 signal averager to collect data. Spectra can then be processed with a personal computer and commercially available data acquisition software. All of these are described in the Dai et al. publication.

Carbon in various forms, i.e., glassy carbon, graphite and particularly diamond, exhibits a Raman spectrum that can be used for fairly precise high temperature measurement. In particular, the ratio of the Stokes to anti-Stokes Raman line of diamond can be correlated to temperature over the range of about 350° to greater than 2,100° C. (i.e., the thermal stability limit of diamond). As long as the diamond film remains intact, the temperature of the melt is measurable by the Raman signals being transmitted through the optical fiber core of the probe.

The Raman signal is excited by transmitting optical radiation down the core to the coated end. It is expected that the probe would last for months to years of service, depending on the thickness of the diamond coating.

Preferably the exciting radiation is in the visible or ultraviolet range, however, radiation having other wavelengths could be used. The exciting radiation interacts with the diamond film coating 22 at the end 18 to produce a Raman scattered light. This scattered light then passes from the distal end 18 of the probe 10 to the proximal end 20 where it is measured and analyzed to determine the temperature of the diamond film coating, and the environment adjacent the coating.

A Raman spectrum is produced when exciting radiation of a single wavelength interacts with a molecule. The radiation scattered when the exciting radiation contacts the molecule contains a small amount of radiation with wavelengths different from that of the incident radiation. This is known as the Raman effect. The wavelengths present in the scattered radiation are characteristic of the structure of the molecule, and the intensity of the radiation is dependent on the concentration of the molecules. The spectrum produced by the scattered radiation also varies depending upon the temperature of the molecule, and the molecule's temperature can determined by measuring the Stokes/anti-Stokes Raman line for the molecule. See, Sheng Dai, J. P. Young, C. M. Begun, Gleb Manantov, "Temperature Measurement by Observation of the Raman Spectrum, of Diamond," *App. Spectros.*, 46, 375 (1992).

Diamond is a very good coating material in that it has a relatively narrow Raman spectrum and the spectrum is sufficiently removed from the exciting radiation to prevent interference.

Although diamond has been disclosed as the preferred coating material, other materials could be used in accordance with the present invention. Specifically, materials exhibiting spectrum characteristics, heat resistance, and corrosion resistance similar to diamond could be used as a coating material without departing from the spirit of the present invention.

Although the probe 10 has particular applicability to the aluminum production industry, the sensor 10 may be used for measuring the temperature of a variety of melts.

In other embodiments of the present invention, diamond need not coat the distal end of the sensor. Rather, a diamond could be positioned adjacent the distal end of the fiber optic rod in a position where the exciting radiation would contact the diamond. The diamond would then be held in position by applying a protective coating encasing the diamond and the distal end of the fiber optic rod.

While the preferred embodiments of the present invention have been shown and described, it will be understood that it is not intended to limit the disclosure, but rather it is intended to cover all modifications and alternative methods falling within the spirit and scope of the invention and defined in the appended claims.

What is claimed is:

1. A temperature sensing probe, comprising:
   no more than one optical fiber for transmitting an excitation radiation of a given wavelength; and
   cover means, disposed in the path of the excitation radiation and over at least a portion of the optical fiber, for producing a Raman signal in response to the excitation radiation, wherein the optical fiber is used to transmit the Raman signal produced in response to the excitation radiation,
   and wherein the Raman signal changes in accordance with changes in the temperature of the cover means.

2. A temperature sensing probe according to claim 1, wherein:
   the optical fiber has a first end portion and a second end portion.

3. A temperature sensing probe according to claim 2, wherein:

the cover means comprises a diamond film coating deposited on the first end portion of the optical fiber.

4. A temperature sensing probe according to claim 1, wherein:
the cover means comprises a first protective covering made from a material selected from the group consisting of glassy carbon, graphite and diamond.

5. A temperature sensing probe according to claim 1, wherein:
the cover means comprises a first protective covering made of a carbon-based material.

6. A temperature sensing probe according to claim 5, further comprising:
a second protective covering disposed over the first protective covering, the second protective covering being made of a material resistive to steel melts.

7. A temperature sensing probe according to claim 6, wherein:
the second protective covering is made of a material selected from the group consisting of zirconium dioxide, titanium nitride, and titanium diboride.

8. A temperature sensing probe according to claim 1, wherein:
the optical fiber has a core made of a material selected from the group consisting of silica, sapphire, and zirconium dioxide.

9. A temperature sensing probe, consisting essentially of:
a single optical fiber, having a first end portion and a second end portion for transmitting an excitation radiation of a given wavelength; and
a covering made from a material selected from the group consisting of glassy carbon, graphite and diamond, disposed in the path of the excitation radiation and over at least a portion of the optical fiber, for producing a Raman signal in response to the excitation radiation,
wherein the Raman signal produced in response to the excitation radiation is transmitted in the optical fiber,
and wherein the Raman signal changes in accordance with changes in the temperature of the covering.

10. An apparatus, comprising in combination:
a temperature sensing probe;
a sample juxtaposed with the temperature sensing probe; and
a signal analyzer coupled to the temperature sensing probe;
wherein the temperature sensing probe comprises no more than one optical fiber transmitting an excitation radiation of a given wavelength, and the temperature sensing probe further comprises a cover that is disposed in the path of the excitation radiation and over at least a portion of the optical fiber producing a Raman signal in response to the excitation radiation;
wherein the optical fiber transmits the Raman signal produced in response to the excitation radiation;
and wherein the Raman signal changes in accordance with changes in the temperature of the sample juxtaposed with the cover.

11. An apparatus according to claim 10, wherein:
the optical fiber has a first end portion placed in the sample and a second end portion coupled to the signal analyzer.

12. An apparatus according to claim 11, wherein:
the cover comprises a diamond film coating deposited on the first end portion of the optical fiber.

13. An apparatus according to claim 10, wherein:
the cover comprises a first protective covering made from a material selected from the group consisting of glassy carbon, graphite and diamond.

14. An apparatus according to claim 10, wherein:
the cover comprises a first protective covering made of a carbon-based material.

15. An apparatus according to claim 14, further comprising:
a second protective covering disposed over the first protective covering,
wherein the second protective covering is made of a material resistive to steel melts.

16. An apparatus according to claim 15, wherein:
the second protective covering is made of a material selected from the group consisting of zirconium dioxide, titanium nitride, and titanium diboride.

17. An apparatus according to claim 10, wherein:
the optical fiber has a core made of a material selected from the group consisting of silica, sapphire, and zirconium dioxide.

* * * * *